(12) United States Patent
Yang et al.

(10) Patent No.: US 10,225,641 B2
(45) Date of Patent: Mar. 5, 2019

(54) WEARABLE ELECTRONIC DEVICE

(71) Applicant: SHENZHEN ROYOLE TECHNOLOGIES CO. LTD., Shenzhen, Guangdong (CN)

(72) Inventors: Songling Yang, Guangdong (CN); Chao Jiang, Guangdong (CN); Songya Chen, Guangdong (CN); Zihong Liu, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/570,460

(22) PCT Filed: Apr. 30, 2015

(86) PCT No.: PCT/CN2015/078152
§ 371 (c)(1),
(2) Date: Oct. 30, 2017

(87) PCT Pub. No.: WO2016/172990
PCT Pub. Date: Nov. 3, 2016

(65) Prior Publication Data
US 2018/0146277 A1   May 24, 2018

(51) Int. Cl.
*H04R 1/10* (2006.01)
*G02B 27/01* (2006.01)
*G06F 1/16* (2006.01)

(52) U.S. Cl.
CPC ....... *H04R 1/1066* (2013.01); *G02B 27/0176* (2013.01); *G02B 2027/0159* (2013.01);
(Continued)

(58) Field of Classification Search
None
See application file for complete search history.

(56) References Cited

U.S. PATENT DOCUMENTS

| 8,942,404 | B1* | 1/2015 | Serota | G02B 27/0176 345/8 |
| 2005/0256675 | A1* | 11/2005 | Kurata | G02B 27/0093 702/153 |
| 2018/0003986 | A1* | 1/2018 | Guo | G02B 27/0176 |

FOREIGN PATENT DOCUMENTS

| CN | 102918443 | 2/2013 |
| CN | 104254025 | 12/2014 |

(Continued)

OTHER PUBLICATIONS

International search report dated Jan. 28, 2016 from corresponding application No. PCT/CN2015/078152.

*Primary Examiner* — James K Mooney
(74) *Attorney, Agent, or Firm* — Hauptman Ham, LLP (57) ABSTRACT

A wearable electronic device includes: a headphone including two sound generators and an elastic band connecting the two sound generators; a display part including two end portions and a middle portion located between the two end portions; and two movable members, wherein each sound generator is movably connected to the corresponding end portion of the display part via the corresponding movable member. Since the sound generator is movably connected to the end portion of the display part via the movable member, the end portion of the display part is not bent and deformed when the headphone is opened outward, such that the restoring force caused by deformation is not increased or even generated, thereby facilitating use of the user.

19 Claims, 4 Drawing Sheets

(52) U.S. Cl.
CPC .............. *G06F 1/163* (2013.01); *H04R 1/105* (2013.01); *H04R 1/1008* (2013.01); *H04R 1/1041* (2013.01); *H04R 2499/15* (2013.01)

(56) References Cited

FOREIGN PATENT DOCUMENTS

| CN | 104503083 | 4/2015 |
|---|---|---|
| CN | 104536135 | 4/2015 |
| WO | 2015054322 | 4/2015 |

\* cited by examiner

WEARABLE ELECTRONIC DEVICE

RELATED APPLICATIONS

The present application is a National Phase of International Application Number PCT/CN2015/078152, filed Apr. 30, 2015.

TECHNICAL FIELD

The present disclosure relates to a wearable electronic device, and more particularly, to a wearable electronic device having a stretchable structure.

BACKGROUND

Currently, wearable electronic devices are becoming more and more popular due to their good visual experience. A wearable video device typically includes a video part and an audio part. In some wearable video devices, headphones are utilized in order to achieve better audio effects. In this case, the video part may be rotatably connected to the headphone. When not in use, the video part is rotated to a position substantially overlapping the headphone so as to facilitate storage; when in use, the video part is rotated to a position substantially perpendicular to the headphone, such that the video part is located in front of eyes of a user wearing the wearable video device.

When the user is to wear the foregoing wearable video device, the headphone is firstly opened outward to facilitate being worn on the head of the user. However, a distance between two sound generators is actually increased when the headphone is opened outward, thereby causing the video part connected to the two sound generators to be deformed. The deformed video part produces a restoring force which increases a force for opening the headphone, which is disadvantageous for operations of the user. Furthermore, the video part is readily damaged after being used many times, thereby reducing a service life of the wearable video device.

SUMMARY

Implementations of the present disclosure provide a wearable electronic device which facilitates the operations and is advantageous for improving service life of the device.

A wearable electronic device includes: a headphone including two sound generators and an elastic band connecting the two sound generators; a display part including two end portions and a middle portion located between the two end portions; and two movable members, wherein each sound generator is movably connected to the end portion of the display part via the corresponding movable member.

In the present disclosure, since the sound generator is movably connected to the end portion of the display part via the movable member, the end portion of the display part is not bent and deformed when the headphone is opened outward, such that the restoring force due to the deformation is not increased or even generated, thereby facilitating use of the user.

BRIEF DESCRIPTION OF THE DRAWINGS

Accompanying drawings are intended to describe the present disclosure in detail, in conjunction with various implementations. It should be understood that various elements illustrated in the drawings do not represent actual sizes and proportions, and illustrations which are given merely for the purpose of clarity are not construed as a limit to the present disclosure.

DETAILED DESCRIPTION

The present disclosure is further described in detail hereinafter with reference to the implementations and drawings, in order to more fully understand purposes, solutions, and advantages of the present disclosure. It should be understood that, the implementations described herein are merely for explaining the present disclosure and are not intended to limit the present disclosure. It should be noted that a "connection" between two elements mentioned herein may not necessarily refer to a direct connection, and may be an indirect connection via a third element.

Figure 1:
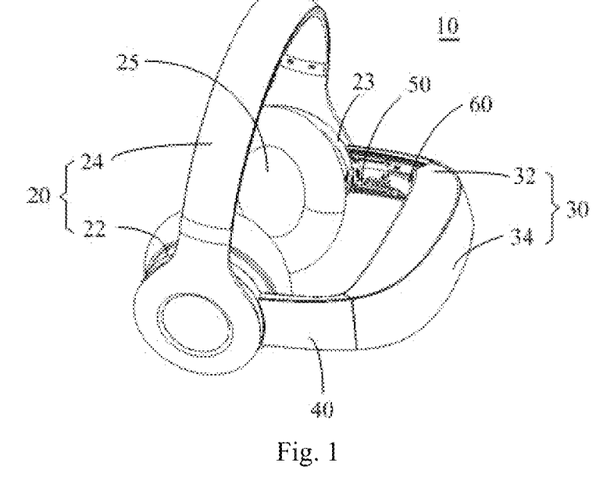
FIG. 1 is a schematic view of a wearable electronic device according to a first implementation of the present disclosure.

FIG. 1 is a schematic view of a wearable electronic device 10 according to a first implementation of the present disclosure. The wearable electronic device 10 may be a wearable video player, a wearable game device, a wearable navigation device, or the like. The wearable electronic device 10 includes a headphone 20, a display part 30, two movable members 40, two connecting mechanisms 50, and two extension mechanisms 60.

The headphone 20 includes two sound generators 22 and an elastic band 24 connecting the two sound generators 22. The elastic band 24 has a substantial C-shape, and the two sound generators 22 are connected to two sides of the opening of the C-shape of the elastic band 24 respectively. The two sound generators 22 can be held on ears respectively, by an elastic force produced by the elastic band 24. The headphone 20 has a structure which is not quite different from the related headphone and thus not described in detail herein. The display part 30 includes two end portions 32 and a middle portion 34 located between the two end portions. In the middle of the middle portion 34, a display module and an optical module (not illustrated) for the near-eye display is provided. The sound generators 22 are movably connected to the end portions 32 respectively, via the movable members 40. Specifically, the sound generators 22 are connected to the movable members 40 via the connecting mechanisms 50 respectively, and the movable members 40 are connected to the end portions 32 via the extension mechanisms 60. As illustrated in FIG. 1, when the user wears the wearable electronic device 10, the display part 30 is located in front of eyes. As such, the user can see images projected by the display part 30 to the eyes and simultaneously hear audio from the headphone 20.

Figure 2:
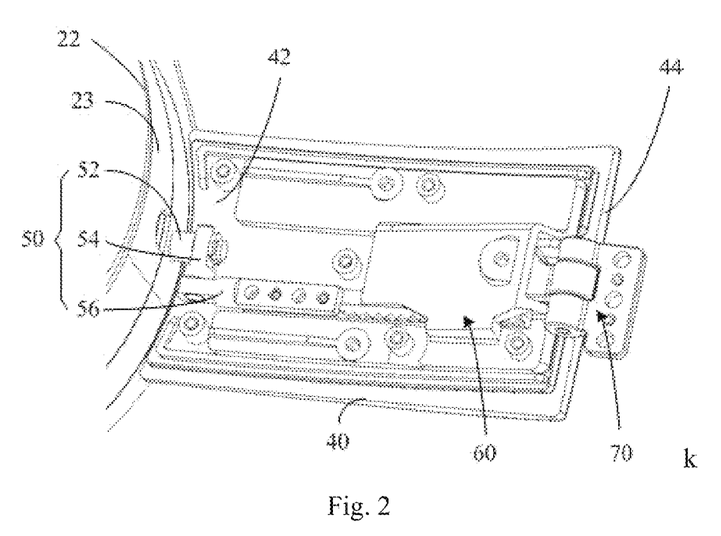
FIG. 2 is an enlarged schematic view of a part of the wearable electronic device as illustrated in FIG. 1.
Figure 3:
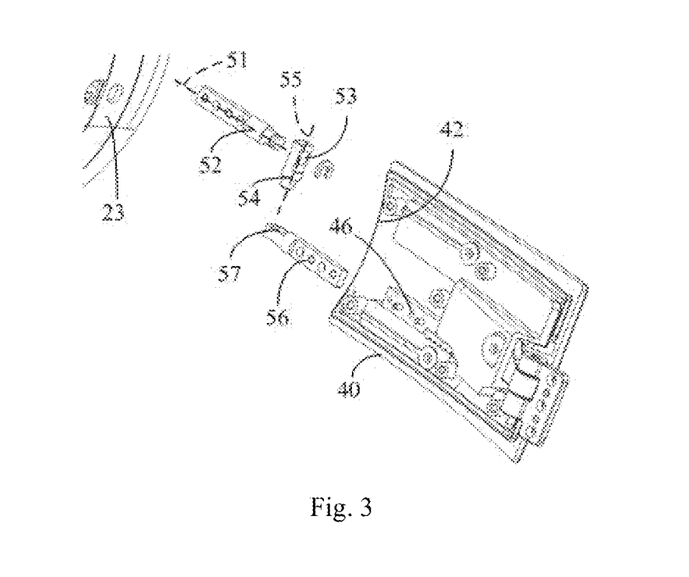
FIG. 3 is an exploded schematic view of a connecting mechanism as illustrated in FIG. 2.

Referring to FIG. 2 and FIG. 3, each of the movable members 40 has a plate shape, and includes a first movable end 42 adjacent to the sound generator 22 and a second movable end 44 adjacent to the end portion 32. Each connecting mechanism 50 includes a first connecting member 52, a second connecting member 54, and a third connecting member 56. The first connecting member 52 is fixed to the sound generator 22, the third connecting member 56 is fixed to the first movable end 42, and the second connecting member 54 is connected to the first connecting member 52 and the third connecting member 56, such that the first movable end 42 is deflectable relative to the sound generator 22. In the present implementation, the first connecting member 52 is a first shaft having a first axis 51 extending from the sound generator 22 towards the first movable end 42, and extends outward from one side surface 23 of the sound generator 22. The side surface 23 is located at an angle with respect to a sound emission surface 25 (FIG. 1) of the sound generator 22 from which sound is emitted. In the present implementation, the angle is substantially 90 degrees, and the first connecting member 52 extends outward and substantially perpendicularly from the side surface 23. Naturally, in other implementations, the angle may be other degrees, and the first connecting member 52 is not limited to extending from the side surface 23, for example, the first connecting member 52 may extend from a surface opposite to the sound emission surface 25.

The second connecting member 54 is a second shaft which includes a first bushing 53 for sheathing the first connecting member 52 and a second axis 55. In the present implementation, the first bushing 53 is an aperture formed at one end of the second connecting member 54, and is located at the one end of the second connecting member 54. Naturally, in other implementations, other varieties of bushings may be used. After the first connecting member 52 is sheathed in the first bushing 53, the second connecting member 54 is rotatable about the first axis 51 of the first connecting member 52, and an angle is formed between the first connecting member 52 and the second connecting member 54. In the present implementation, the angle is substantially 90 degrees, and it should be understood that, the angle is not limited to it.

The third connecting member 56 is a third shaft which includes a second bushing 57 for sheathing the second connecting member 54. In the present implementation, the second bushing 57 is an aperture formed at one end of the third connecting member 56, and is located at the one end of the third connecting member 56. The other end of the third connecting member 56 which is not provided with the second bushing 57 is fixed to the first movable end 42. In the same way, in other implementations, the second bushing 57 may also be other varieties of bushings. The end of the second connecting member 54 which is not provided with the first bushing 53 is sheathed in the second bushing 57, such that the third connecting member 56 is rotatable about the second axis 55 extending from the first connecting member 52 towards the third connecting member 56, and an angle is formed between the second connecting member 54 and the third connecting member 56. In the present implementation, the angle is substantially 90 degrees. In the same way, the angle may also be other degrees. The schematic view of the sound generator 22 being connected to the first movable end 42 via the connecting mechanism 50 without an external force is as illustrated in FIG. 2.

Figure 4:
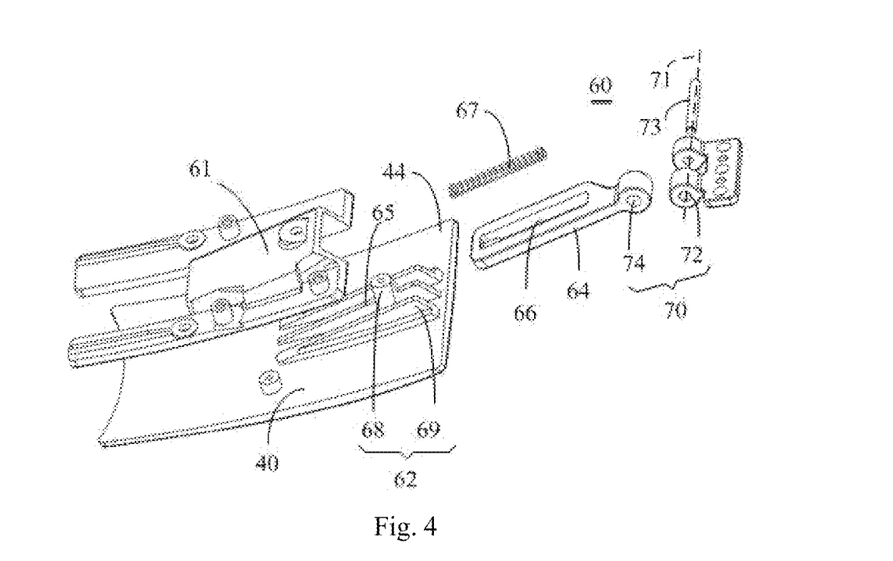
FIG. 4 is an exploded schematic view of an extension mechanism as illustrated in FIG. 2.

Referring to FIG. 2 and FIG. 4, each of the extension mechanism 60 includes a first slider 62 connected to the second movable end 44, and a second slider 64, and further includes a rotation mechanism 70 in this preferable implementation. The second slider 64 is slidably connected to the first slider 62. Specifically, in the present implementation, the second slider 64 is a connecting rod. One side of the connecting rod is connected to the rotation mechanism 70, while the other side is provided with an elongate hole 66 in a direction from the second movable end 44 towards the end portion 32. The first slider 62 is disposed on an inner surface of the second movable end 44, and includes a boss 68 received in the elongate hole 66. The boss 48 is moveable within the elongate hole 66 in a longitudinal direction of the elongate hole 66. The rotation mechanism 70 is disposed at the end portion 32 and has a third axis 71 in a direction from one side of the sound generator 22 away from the elastic band 24 towards the other side close to the elastic band 24, i.e., a substantially vertical direction in FIG. 1 and FIG. 4. The second slider 64 is connected to the rotation mechanism 70 and is rotatable about the third axis 71. Specifically, the rotation mechanism 70 includes two first shaft holes 72 spaced apart and defining the third axis 71, the second slider 64 includes a second shaft hole 74, and a pin 73 extends through the first shaft holes 72 and the second shaft hole 74. Without the external force, the boss 68 is located on a side of the elongate hole 66 away from the sound generator 22, as illustrated in FIG. 2, and in this case, a distance between the sound generator 22 and the end portion 32 is smallest.

When the user is to wear or remove the wearable electronic device 10, forces should be applied to the two sound generators 22 to move them away from each other. As the sound generators 22 are moved away from each other, an angle between the two sound emission surfaces 25 is also actually changed. However, since the second connecting members 54 are rotatable relative to the first connecting members 52 respectively, the first movable ends 42 are not deflected and twisted along with the sound generators 22 during the aforementioned deformation, and are rotated about the first axes 51 respectively. Furthermore, during the aforementioned deformation, the distance between the two sound generators 22 is increased, and at the same time, the first sliders 62 are moved away from the end portions 32 of the display part 30 along with the movable members 40 driven by the sound generators 22, such that the bosses 68 slide within the elongate holes 66 in their longitudinal directions and are located close to sides of the elongate holes 66 close to the sound generators 22 respectively. As such, outward deformation of the end portions 32 of the display part 30 is greatly reduced due to relative slide between the first slider 62 and the second slider 64. Hence, restoring forces caused by the deformation of the display unit 30 due to deformation of the sound generators 22 are greatly reduced, thereby facilitating the operations of the user.

In addition, during the aforementioned process, an increase in the distance between the two sound generators 22 also causes the movable members 40 to have a tendency to deflect outward. However, since the third connecting members 56 are rotatable relative to the second connecting members 54 respectively, the aforementioned deflection tendency causes the connecting members to rotate, i.e., the third connecting members 56 rotate about the second connecting members 54 respectively. As such, outward deformation of the two first movable ends 42 of the two movable members 40 is greatly reduced, such that the restoring force due to the deformation is not increased or even generated, thereby facilitating use of the user. Furthermore, when the movable members 40 are still deflected outward, this deflection can be counteracted by rotation of the rotation mechanisms 70. Hence, the deformation of the end portions 32 in this aspect is further reduced, thereby further facilitating the operations of the user.

However, it will be appreciated that, in other implementations, the structural features that allow the movable members 40 to deflect relative to the end portions 32 may not be provided, when the display part 30 has a fine deformability. For example, the third connecting members 56 may not be provided, and in this case, the second connecting members 54 are directly fixed to the movable members 40. Additionally, specified configurations of the first connecting members 52 to the third connecting members 56 are not limited to the aforementioned implementation.

Figure 5:
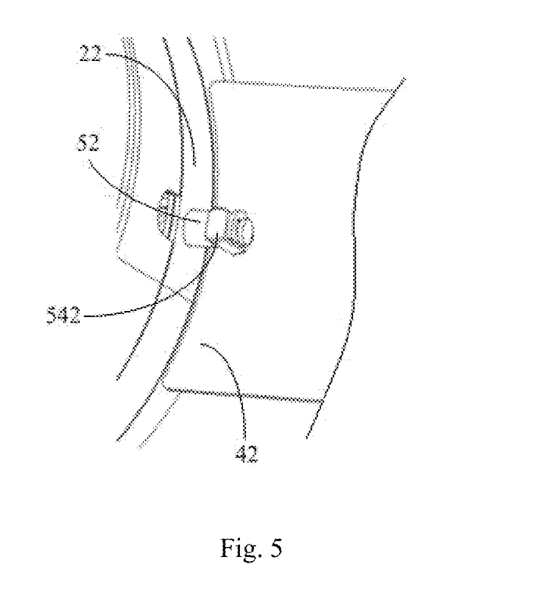
FIG. 5 is a schematic view of a connecting mechanism of a wearable electronic device according to another implementation of the present disclosure.

For example, as illustrated in FIG. 5, each first connecting member 52 is also a rod extending outward from the side surface of the sound generator 22, and each second connecting member 542 is a bushing fixed to the first movable end 42. As such, the second connectors 542 are rotatable about the first connectors 52 relative to the sound generators 22 respectively. Such a structure also achieves an effect of reducing the restoring force of the display part 30 mentioned in the first implementation. It should also be understood that, positions of the first connecting members 52 and the second connecting members 542 are also interchangeable.

Figure 6:
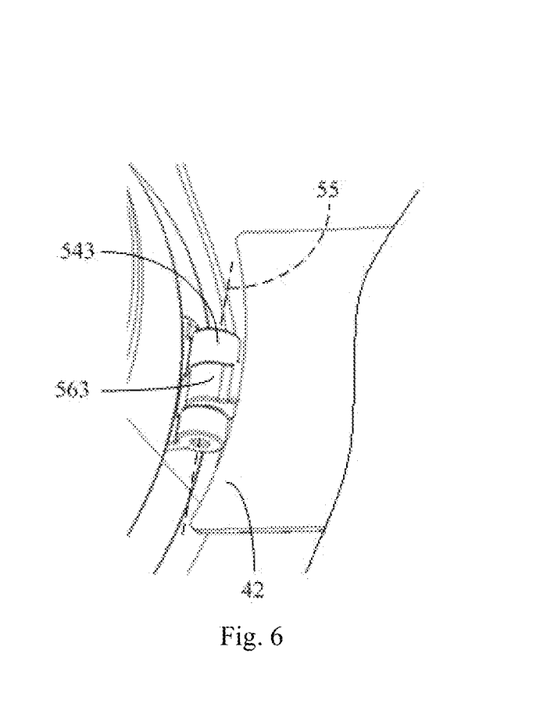
FIG. 6 is a schematic view of a connecting mechanism of a wearable electronic device according to yet another implementation of the present disclosure.

For example, as illustrated in FIG. 6, each second connecting member 543 connected to the sound generator 22 includes two first shaft holes defining a second axis 55, and each third connecting member 563 includes a second shaft hole. A pin extends through the two first shaft holes and the second shaft hole. As such, the third connecting members 563 are rotatable about the second axes 55 of the second connecting members 543 respectively, i.e., the first movable ends 42 are rotatable about the second axes 55 relative to the sound generators 22. Such a structure also achieves an effect of reducing the restoring force of the display part 30 mentioned in the aforementioned implementation. Naturally, the second connecting members 543 may be disposed on the movable members 40 respectively, while the third connecting members 563 may be disposed on the sound generators 22 respectively.

Furthermore, for example, the rotation mechanisms 70 may not be provided, and the second sliders are directly fixed to the end portions 32 respectively.

As described above, rotation about the first axis 51 or the second axis 55 can achieve the technical effect required by the present disclosure. In the present description and claims, the rotation of the movable members 40 about the first axes 51, the second axes 55, or both the first axes 51 and the second axes 55 is collectively referred to as the deflection of the movable members 40 relative to the sound generators 22.

It should be understood that, for the purpose of the extension mechanisms 60 enabling the distances between the end portions 32 of the display part and the moveable members 40 to vary, the extension mechanisms 40 may also have other structures and are not limited to the aforementioned implementations. For example, each extension mechanism may be an elastic member made of material, such as rubber, which is stretchable between the end portion 32 and the second moveable end 44. Similarly, each connecting mechanism may also be a twistable and/or bendable elastic member connected between the sound generator 22 and the first movable end 42.

Preferably, as illustrated in FIG. 2 and FIG. 4, each extension mechanism 60 further includes a spring 67 disposed between the first slider and the second slider. The spring 67 is operable to produce a restoring force to restore the distance between the first slider and the second slider to an initial distance when the distance between the first slider and the second slider varies. Specifically, two ends of each spring 67 abut against the boss 68 and a side of the elongate hole 66 away from the boss 68 respectively. Preferably, each spring 67 is in a compressed state throughout. As such, when a distance between the movable member 40 and the end portion 32 becomes larger, the spring 67 is further compressed such that the boss 68 has a tendency to return to the side of the elongate hole 66 away from the sound generator 22, thereby also facilitating the operations of the user.

Preferably, as illustrated in FIG. 2 and FIG. 4, the first slider 62 further includes a wedge-shaped projection 69 disposed on the inner surface of the second movable end 44. The projection 69 has an inclined surface 65 facing away from the inner surface of the second movable end 44, and one end of the projection 69 away from the sound generator 22 is away from the inner surface of the second movable end 44 than the other end of the projection 69. The boss 68 extends outward from the inclined surface 65. The second slider 64 is located on the inclined surface 65. As such, when the sound generator 22 is moved outward, the boss 68 slides more easily within the elongate hole 66 due to an inclination angle, thereby further facilitating the operations of the user.

Preferably, each extension mechanism 60 further includes a cover 61 which is fixed to the movable member 40 and covers the second slider 64. The cover 61 has a convex portion corresponding to the projection 69 to receive the projection 69 and the second slider 64, thereby preventing the second slider 64 from being separated from the projection 69.

Preferably, as illustrated in FIG. 3, a bump 46 is formed on the inner surface of each movable member 40. The third connecting member 56 is fixed to the bump 46, such that the first, second and third connecting members are spaced apart from the inner surface of the movable member 40, thereby facilitating the rotation of the second connecting member 54 and the third connecting member 56 and enlarging a range in which the sound generator is deformable.

Figure 7:
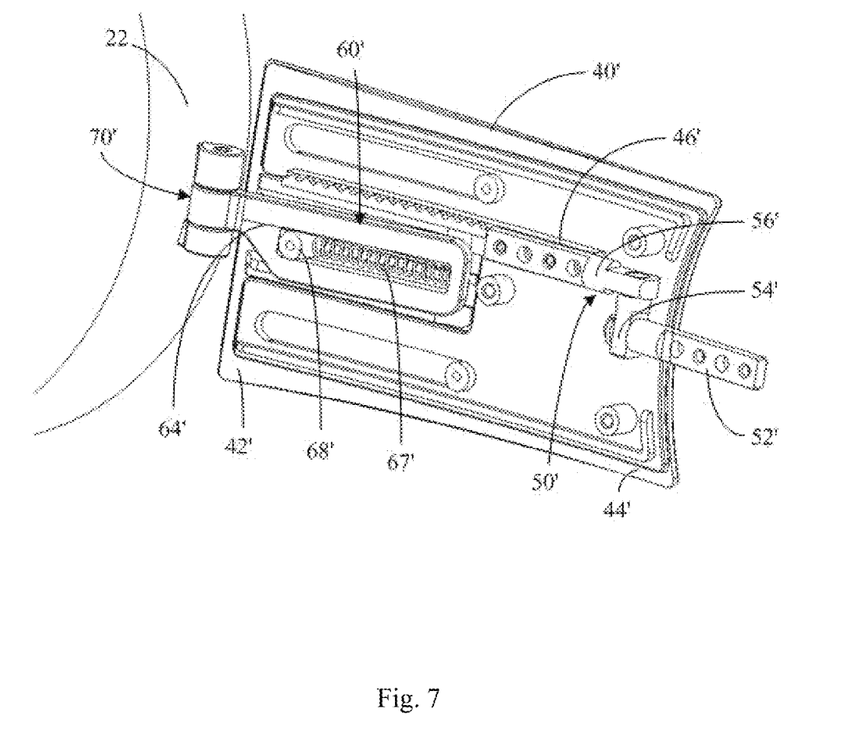
FIG. 7 is a schematic view of a connecting mechanism and an extension mechanism of a wearable electronic device according to still another implementation of the present disclosure.

It should be understood that, technical purposes of the present disclosure is not achieved merely by specified configurations of the connecting mechanisms 50 and the extension structures 60 disclosed by the aforementioned implementations. For example, FIG. 7 is a schematic structural view according to still another implementation of the present disclosure which differs from the aforementioned implementations in that a connecting mechanism 50' and an extending structure 60' are configured in an opposite manner. Specifically, one end of a first connecting member 52' not fixed to the end portion (not illustrated) is sheathed in one end of a second connecting member 54', the other end of the second connecting member 54' is sheathed in one end of a third connecting member 56, and the other end of the third connecting member 56' is fixed to a second movable end 44' of a movable member 40'. Preferably, the third connecting member 56' is fixed to a bump 46' disposed on an inner surface of the movable member 40'. A second slider having a boss 68' and a wedge-shaped projection is disposed on a first moveable end 42', and the second slider in this implementation may be understood with reference to the first slider 62 in the aforementioned implementations; a first slider 64' having an elongate hole is rotatably connected to a sound generator 22 via a rotation mechanism 70', and the first slider 64' may be understood with reference to the second slider 64 in the aforementioned implementations. Preferably, a spring 67' is further disposed between the boss 68' and one end of the elongate hole away from the sound generator 22. In the second implementation, the reference numerals of the components functioning identically to those components in the first implementation are formed by adding "'" after the reference numerals of those components in the first implementation. Persons skilled in the art can be aware of differences between the present implementation and the first implementation from the description of the first implementation, and these differences are not explained herein.

From the description of the aforementioned various implementations, the purposes of the present disclosure can be achieved as long as the movable members are provided and the sound generator is moveably connected to the corresponding end portion of the display part in an extendable and/or deflectable manner via the corresponding moveable member, regardless of positions of the movable member where the extending mechanism or the connecting mechanism is disposed. The foregoing is merely the preferable implementations of the present disclosure, and is not intended to limit the present disclosure. Any amendments, equivalent substitutions, improvements, and so forth within the spirit and principle of the present disclosure should be included within the protection scope of the present disclosure.

What is claimed is:

1. A wearable electronic device comprising:
   a headphone comprising two sound generators and an elastic band connecting the two sound generators;
   a display part comprising two end portions and a middle portion located between the two end portions; and
   two movable members, wherein each movable member comprises two opposite movable ends respectively connecting to the corresponding sound generator and the corresponding end portion of the display part, one movable end is capable of rotating about a first axis extending from the corresponding sound generator towards the corresponding end portion and rotating about a second axis perpendicular the first axis, and the other movable end is capable of moving along a direction from the corresponding sound generator towards the corresponding end portion.

2. The wearable electronic device of claim 1, wherein the opposite movable ends of each movable member comprise a first movable end adjacent to the corresponding sound generator and a second movable end adjacent to the corresponding end portion of the display part,
   the electronic device further comprises:
   two connecting mechanisms, wherein each of the connecting mechanism is connected to the corresponding sound generator and the corresponding first moveable end such that the corresponding first moveable end is deflectable relative to the corresponding sound generator; and
   two extension mechanisms, wherein each of the extension mechanisms is connected to the corresponding second movable end and the corresponding end portion of the display part such that a distance between the corresponding end portion of the display part and the corresponding second movable end is variable.

3. The wearable electronic device of claim 2, wherein each of the connecting mechanisms comprises a first connecting member fixed to the corresponding sound generator and a second connecting member connected to the corresponding first movable end; and the second connecting member is connected to the first connecting member and is rotatable about the first axis.

4. The wearable electronic device of claim 3, wherein the first connecting member comprises a first shaft or a first bushing having the first axis, and the second connecting member comprises a second bushing connected to the first shaft or a second shaft connected to the first bushing.

5. The wearable electronic device of claim 3, wherein the first connecting member comprises a first shaft extending from the corresponding sound generator towards the corresponding end portion of the display part, and the second connecting member comprises a first bushing in which the first shaft is sheathed.

6. The wearable electronic device of claim 5, wherein each of the connecting mechanisms further comprises a third connecting member fixed to the corresponding first moveable end, the second connecting member is connected to the corresponding first moveable end via the third connecting member; the second axis extends from the first connecting member towards the third connecting member, the third connecting member is rotatable about the second axis.

7. The wearable electronic device of claim 6, wherein the second connecting member comprises a second shaft having the second axis and the first bushing, and the third connecting member comprises a second bushing connected to the second shaft.

8. The wearable electronic device of claim 6, wherein a bump is further formed on the corresponding first moveable end, and the third connecting member is fixed to the bump such that the first, second and third connecting members are spaced from the inner surface of the corresponding first movable end.

9. The wearable electronic device of claim 2, wherein each of the extension mechanisms comprises a first slider disposed on the corresponding movable member and a second slider connected to the corresponding end portion of the display part, the second slider is slidably connected to the first slider.

10. The wearable electronic device of claim 9, wherein the second slider comprises a connecting rod which defines an elongate hole along the direction from the corresponding movable member towards the corresponding end portion of the display part; the first slider comprises a boss which is received within the elongate hole and is movable within the elongate hole along a longitudinal direction of the elongate hole.

11. The wearable electronic device of claim 10, wherein the first slider further comprises a wedge-shaped projection disposed on an inner surface of the corresponding movable member, the boss is located on an inclined surface of the wedge-shaped projection, one end of the wedge-shaped projection away from the sound generator is away from the inner surface of the movable member than the other end of the wedge-shaped projection; the second slider is disposed on the inclined surface of the wedge-shaped projection.

12. The wearable electronic apparatus of claim 9, further comprising a rotation mechanism being disposed on the corresponding end portion of the display part and having a third axis perpendicular to the first axis, wherein the second slider is connected to the rotation mechanism and is rotatable about the third axis.

13. The wearable electronic device of claim 12, wherein the rotation mechanism comprises at least one first shaft hole having the third axis, and the second slider comprises at least one second shaft hole, and a pin extends through the at least one first shaft hole and the at least one second shaft hole.

14. The wearable electronic device of claim 9, further comprising a spring disposed between the first slider and the second slider, and the spring is operable to produce a restoring force to restore a distance between the first slider and the second slider to an initial distance when the distance between the first slider and the second slider varies.

15. The wearable electronic device of claim 1, wherein the opposite movable ends of each movable member comprise a first movable end adjacent to one sound generator and a second movable end adjacent to a corresponding end portion of the display part, the electronic device further comprises:

two connecting mechanisms each being connected to the corresponding end portion of the display part and the second moveable end such that the second movable end is deflectable relative to the corresponding end portion of the display part; and two extension mechanisms each being connected to the first movable end and the corresponding sound generator such that a distance between the corresponding sound generator and the first movable end is variable.

16. The wearable electronic device of claim 15, wherein each of the connecting mechanisms comprises a first connecting member fixed to the corresponding end portion of the display part and a second connecting member connected to the second movable end; and the second connecting member is connected to the first connecting member and is rotatable about the first axis.

17. The wearable electronic device of claim 16, wherein the first connecting member comprises a first shaft or a first bushing having the first axis, and the second connecting member comprises a second bushing connected to the first shaft or a second shaft connected to the first bushing.

18. The wearable electronic device of claim 16, wherein the first connecting member comprises a first shaft extending from the corresponding end portion of the display part towards the second connecting member, and the second connecting member comprises a first bushing in which the first shaft is sheathed.

19. The wearable electronic device of claim 18, wherein each of the connecting mechanisms further comprises a third connecting member fixed to the second moveable end, the second connecting member is connected to the second moveable end via the third connecting member; the second axis extends from the first connecting member towards the third connecting member, the third connecting member is rotatable about the second axis.

* * * * *